US012613328B2

(12) United States Patent
Lee et al.

(10) Patent No.: US 12,613,328 B2
(45) Date of Patent: Apr. 28, 2026

(54) METHOD AND APPARATUS WITH GRID MAP GENERATION

(71) Applicant: SAMSUNG ELECTRONICS CO., LTD., Suwon-si (KR)

(72) Inventors: Jaehwa Lee, Seoul (KR); Dongkyu Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/865,667

(22) Filed: Jul. 15, 2022

(65) Prior Publication Data

US 2023/0025981 A1 Jan. 26, 2023

(30) Foreign Application Priority Data

Jul. 23, 2021 (KR) ........................ 10-2021-0097076

(51) Int. Cl.
| | |
|---|---|
| *G01S 13/72* | (2006.01) |
| *G01S 7/41* | (2006.01) |
| *G01S 13/89* | (2006.01) |
| *G01S 13/931* | (2020.01) |

(52) U.S. Cl.
CPC ............ *G01S 13/726* (2013.01); *G01S 7/415* (2013.01); *G01S 13/89* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 2017/0001637 A1* | 1/2017 | Nguyen Van | ........... G01S 13/87 |
| 2018/0306912 A1 | 10/2018 | Branson | |
| 2020/0112745 A1* | 4/2020 | Joshi | .................... H04N 13/275 |
| 2020/0406929 A1 | 12/2020 | Markiewicz et al. | |
| 2021/0018615 A1 | 1/2021 | Su et al. | |
| 2021/0312225 A1* | 10/2021 | Ku | .......................... G06V 20/56 |
| 2021/0347378 A1* | 11/2021 | Nabatchian | ............ G06V 20/56 |
| 2022/0111793 A1* | 4/2022 | Iino | .......................... B60R 1/26 |

FOREIGN PATENT DOCUMENTS

| | | |
|---|---|---|
| CN | 105372654 B | 12/2017 |
| CN | 109212530 A | 1/2019 |
| CN | 110766979 A | 2/2020 |
| CN | 110286389 B | 5/2021 |
| JP | 6009788 B2 | 10/2016 |
| JP | 2021-56608 A | 4/2021 |

\* cited by examiner

*Primary Examiner* — Whitney Moore
(74) *Attorney, Agent, or Firm* — NSIP Law

(57) ABSTRACT

A method with grid map generation includes: determining position information of a moving object corresponding to a first time step based on a position sensor of the moving object; determining detection information of nearby objects present around the moving object corresponding to the first time step based on a radio detection and ranging (radar) sensor of the moving object; selecting a still object in a moving range of the moving object from among the nearby objects, based on the position information and the detection information; updating a point cloud determined based on the radar sensor in a previous time step of the first time step, based on the position information and on detection information of the still object comprised in the detection information of the nearby objects; and generating a grid map based on an occupancy probability for each grid of the updated point cloud.

21 Claims, 17 Drawing Sheets

From 130

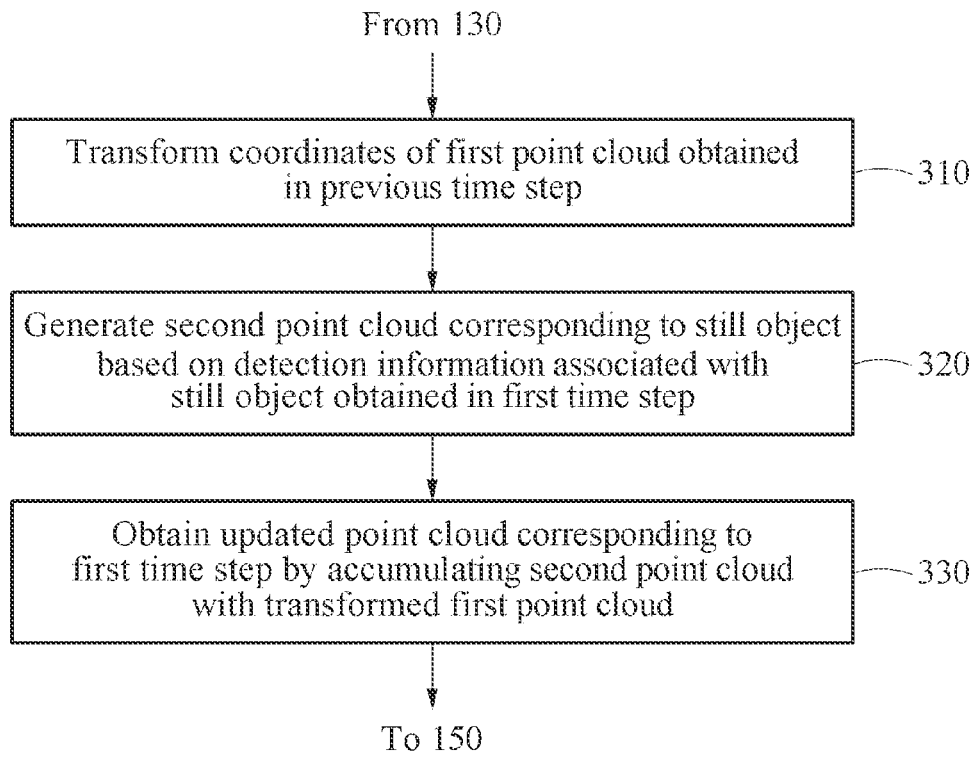

Transform coordinates of first point cloud obtained
in previous time step ——310

Generate second point cloud corresponding to still object
based on detection information associated with
still object obtained in first time step ——320

Obtain updated point cloud corresponding to
first time step by accumulating second point cloud
with transformed first point cloud ——330

METHOD AND APPARATUS WITH GRID MAP GENERATION

CROSS-REFERENCE TO RELATED APPLICATIONS

This application claims the benefit under 35 USC § 119(a) of Korean Patent Application No. 10-2021-0097076, filed on Jul. 23, 2021 in the Korean Intellectual Property Office, the entire disclosure of which is incorporated herein by reference for all purposes.

BACKGROUND

1. Field

The following description relates to a method and apparatus with grid map generation.

2. Description of Related Art

A light detection and ranging (lidar) system may be a detection system configured to measure position coordinates of a reflector by measuring a time used for an emitted laser pulse to be returned after being reflected. Although the lidar system may be used as a sensor for recognizing an environment around a traveling vehicle, it may be expensive in price and need a great amount of computation or operation.

In contrast, a radio detection and ranging (radar) system may be a detection system configured to measure the distance, direction, angle, and velocity of an object by analyzing an electromagnetic wave returning after an emitted radio wave strikes on the object. The radar system may have a lower range resolution than the lidar system, and thus may not have a high accuracy in recognizing an environment around a traveling vehicle. The range resolution of the radar system may be associated with a bandwidth of a transmission waveform, and the available bandwidth may be specified under a radio wave act or regulation. A previously specified frequency band for a radar system included 0.2 gigahertz (GHz) near 24 GHz and 1 GHz near 77 GHz. However, the range of use of a radar system is increasing as a 4 GHz band of a 79 GHz region is specified.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method with grid map generation includes: determining position information of a moving object corresponding to a first time step based on a position sensor of the moving object; determining detection information of nearby objects present around the moving object corresponding to the first time step based on a radio detection and ranging (radar) sensor of the moving object; selecting a still object in a moving range of the moving object from among the nearby objects, based on the position information and the detection information; updating a point cloud determined based on the radar sensor in a previous time step of the first time step, based on the position information and on detection information of the still object comprised in the detection information of the nearby objects; and generating a grid map based on an occupancy probability for each grid of the updated point cloud.

The updating of the point cloud may include: transforming coordinates of a first point cloud determined in the previous time step, with respect to a position of the moving object in the first time step determined based on the position information; generating a second point cloud corresponding to the still object, based on detection information of the still object determined in the first time step; and determining an updated point cloud corresponding to the first time step by accumulating the second point cloud with the transformed first point cloud.

The method may include removing the first point cloud determined in the previous time step.

The detection information may include relative position information of the nearby objects with respect to a position of the radar sensor, and the updating of the point cloud further may include transforming relative position information of the still object comprised in the detection information with respect to a position of the moving object, based on a relative position relationship of the radar sensor and the moving object.

The selecting of the still object may include: filtering out nearby objects positioned at a height greater than or equal to a preset first threshold value corresponding to a height of the moving object, based on relative position information of the nearby objects comprised in the detection information; and selecting the still object from among the filtered nearby objects, based on velocity information of the moving object comprised in the position information and relative velocity information of the nearby objects comprised in the detection information.

The selecting of the still object may include: filtering out nearby objects of which an angle formed with the moving object is greater than or equal to a preset second threshold value, based on relative position information of the nearby objects comprised in the detection information; and selecting the still object from among the filtered nearby objects, based on velocity information of the moving object comprised in the position information and relative velocity information of the nearby objects comprised in the detection information.

The updating of the point cloud further may include: setting a region of interest (ROI) of traveling of the moving object based on the position information of the moving object; and filtering out a point cloud corresponding to a still object that is not comprised in the ROI among point clouds corresponding to still objects selected through the selecting.

The generating of the grid map further may include generating a moving path of the moving object corresponding to the still object based on the grid map.

The generating of the moving path of the moving object may include generating the moving path of the moving object that detours a space occupied by the still object, based on the grid map.

The determining of the position information of the moving object may include determining any one or any combination of any two or more of velocity information of the moving object, yaw rate information of the moving object, and global positioning system (GPS) information of the moving object corresponding to the first time step.

The determining of the detection information of the nearby objects may include determining either one or both of relative position information of the nearby objects and relative velocity information of the nearby objects with respect to the radar sensor corresponding to the first time step.

The point cloud may be generated based on a signal sensed by the radar sensor, and may include a set of one or more points corresponding to the sensed signal in a coordinate system having a position of the moving object as a reference point.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with grid map generation includes: one or more processors configured to: determine position information of a moving object corresponding to a first time step based on a position sensor of the moving object; determine detection information of nearby objects present around the moving object corresponding to the first time step based on a radio detection and ranging (radar) sensor of the moving object; select a still object in a moving range of the moving object from among the nearby objects based on the position information and the detection information; update a point cloud determined based on the radar sensor in a previous time step of the first time step, based on the position information and detection information of the still object comprised in the detection information of the nearby objects; and generating a grid map based on an occupancy probability for each grid of the updated point cloud.

For the updating of the point cloud, the one or more processors may be configured to: transform coordinates of a first point cloud determined in the previous time step, with respect to a position of the moving object in the first time step determined based on the position information; generate a second point cloud corresponding to the still object, based on detection information of the still object determined in the first time step; and determine an updated point cloud corresponding to the first time step by accumulating the second point cloud with the transformed first point cloud.

The detection information may include relative position information of the nearby objects with respect to a position of the radar sensor, and, for the updating of the point cloud, the one or more processors may be configured to transform relative position information of the still object comprised in the detection information with respect to a position of the moving object, based on a relative position relationship of the radar sensor and the moving object.

For the selecting of the still object, the one or more processors may be configured to: filter out nearby objects positioned at a height greater than or equal to a preset first threshold value corresponding to a height of the moving object, based on relative position information of the nearby objects comprised in the detection information; and select the still object from among the filtered nearby objects, based on velocity information of the moving object comprised in the position information and relative velocity information of the nearby objects comprised in the detection information.

For the selecting of the still object, the one or more processors may be configured to: filter out nearby objects of which an angle formed with the moving object is greater than or equal to a preset second threshold value, based on relative position information of the nearby objects comprised in the detection information; and select the still object from among the filtered nearby objects, based on velocity information of the moving object comprised in the position information and relative velocity information of the nearby objects comprised in the detection information.

For the updating of the point cloud, the one or more processors may be configured to: set a region of interest (ROI) of traveling of the moving object based on the position information of the moving object; and filter out a point cloud corresponding to a still object that is not comprised in the ROI among point clouds corresponding to still objects selected through the selecting.

For the generating of the grid map, the one or more processors may be configured to generate a moving path of the moving object corresponding to the still object based on the grid map.

In another general aspect, a method with grid map generation includes: determining a first point cloud of a nearby object using a radio detection and ranging (radar) sensor at a first position; transforming coordinates of the first point cloud based on a second position of the radar sensor; determining a second point cloud of the nearby object using the radar sensor at the second position; determining an updated point cloud of the nearby object based on the second point cloud and the transformed first point cloud; and generating a grid map based on an occupancy probability for each grid of the updated point cloud.

The nearby object may be a stationary object and the radar sensor may be a moving object.

The determining of the first point cloud may include determining the first point cloud in response to determining that a difference between an absolute value of a relative velocity of the nearby object and an absolute value of the velocity of the radar sensor is less than or equal to a preset threshold value.

The determining of the first point cloud may include determining the first point cloud in response to determining that either one or both of: a height of the nearby object is less than or equal to a preset first threshold value; and an angle between a direction of movement of the radar sensor and a direction from the radar sensor to the nearby object is less than or equal to a preset second threshold value.

Other features and aspects will be apparent from the following detailed description, the drawings, and the claims.

BRIEF DESCRIPTION OF THE DRAWINGS

FIG. 3 illustrates an example of a method of updating a point cloud.

Figure 1:
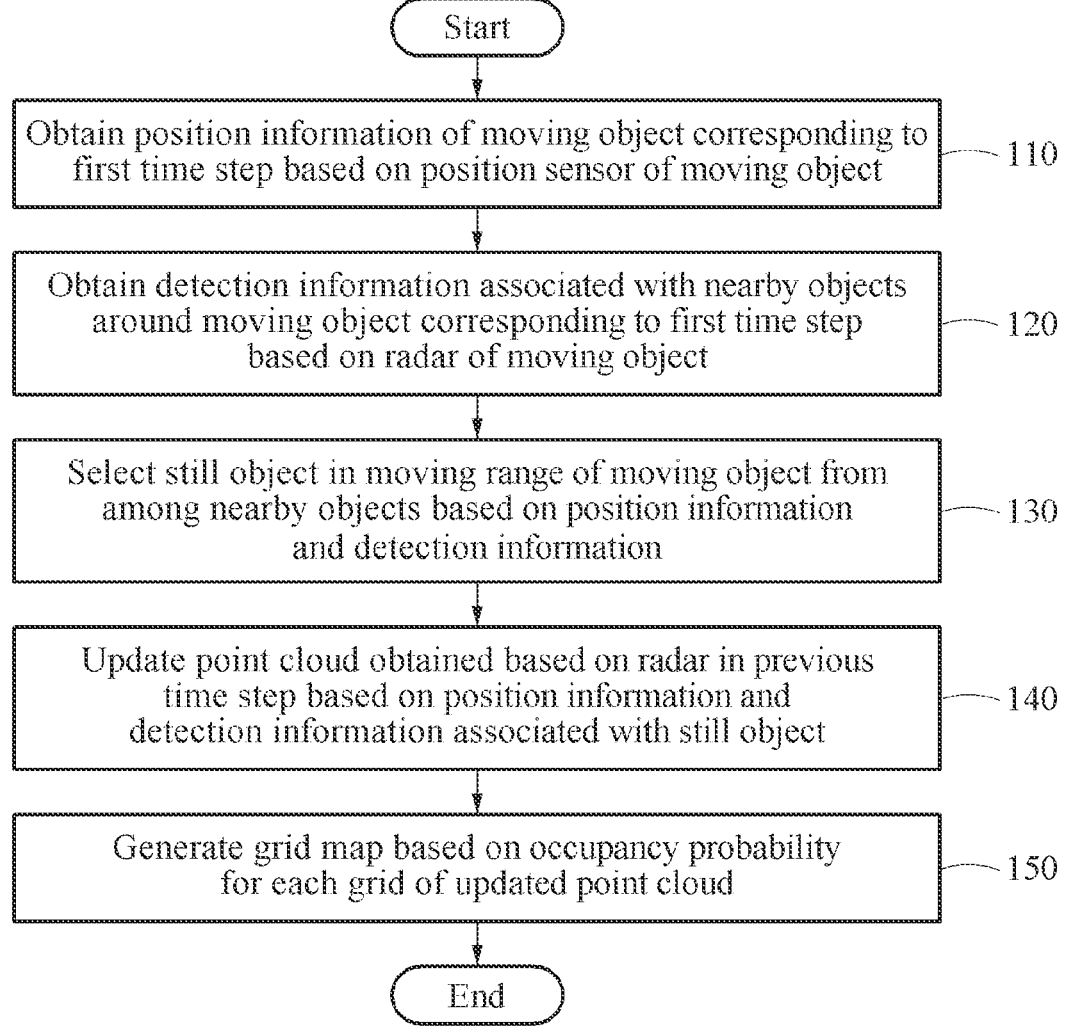
FIG. 1 illustrates an example of a grid map generating method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, for example, "between" and "immediately between" and "adjacent to" and "immediately adjacent to," should also be respectively construed in the same way. As used herein, the term "and/or" includes any one and any combination of any two or more of the associated listed items. The use of the term "may" herein with respect to an example or embodiment (e.g., as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a grid map generating method.

A method and apparatus of one or more embodiments may recognize an environment around a vehicle using a radar system instead of an expensive lidar system. Referring to FIG. 1, a grid map generating method of example embodiments may include operation 110 of obtaining (e.g., determining) position information of a moving object corresponding to a first time step based on a position sensor of the moving object, operation 120 of obtaining detection information associated with nearby objects present around the moving object corresponding to the first time step based on a radio detection and ranging (radar) sensor of the moving object, operation 130 of selecting a still object in a moving range of the moving object from among the nearby objects based on the position information and the detection information, operation 140 of updating a point cloud obtained based on the radar sensor in a previous time step based on the position information and detection information associated with the still object, and operation 150 of generating a grid map based on an occupancy probability for each grid of the updated point cloud. A radar sensor described herein may also be simply referred to as a "radar" and may also be provided in the form of a system, and similarly a light detection and ranging (lidar) sensor described herein may also be simply referred to as a "lidar" and may also be provided in the form of a system.

The operations of the grid map generating method of one or more embodiments may be performed by one or more processors of an apparatus or device of one or more embodiments connected to or interworking with the moving object. A non-limiting example configuration of the apparatus or device performing the grid map generating method will be described hereinafter with reference to FIG. 8.

The moving object may refer to an object of which a position changes while the object moves or travels, and may be or include a vehicle, for example. The apparatus or device performing the grid map generating method may be the moving object, include the moving object, and/or be included in the moving object. The moving object may include one or more sensors (for example, a position sensor and/or a radar). In an example, information obtained from the sensor provided in the moving object may be processed by the processor performing a moving path controlling method, and the obtaining of the information sensed by the sensor and the processing of the obtained information may be performed repeatedly. A unit in which information is obtained by the sensor and/or the obtained information is processed by the processor may be referred to herein as a time step.

In an example, operation 110 may include obtaining the position information of the moving object corresponding to the first time step based on one or more position sensors provided in the moving object. The first time step may correspond to a current time step in which operations 110 through 150 are performed. In an example, operations 110 through 150 are performed for each of a plurality of time steps.

The position sensor provided in the moving object may be a sensor configured to sense a physical quantity associated with (e.g., indicating or corresponding to) a position of the moving object, for example, the position information, displacement information, and velocity information of the moving object. For example, the position sensor provided in the moving object may be used to obtain velocity information of the moving object, yaw rate information of the moving object, and/or global positioning system (GPS) information of the moving object. That is, operation 110 of obtaining position information of a moving object may include obtaining any one or any combination of any two or more of velocity information, yaw rate information, and GPS information of the moving object corresponding to the first time step.

In an example, operation 120 may include obtaining the detection information associated with the nearby objects present around the moving object corresponding to the first time step, based on one or more radars provided in the moving object. The radar provided in the moving object may refer to a sensor configured to measure the distance, direction, angle, and velocity of a nearby object by emitting a radio wave and analyzing an electromagnetic wave returning after the emitted radio wave is reflected by the nearby object.

The radio wave emitted from the radar may be reflected by a point on one surface of the nearby object, and the radar may obtain detection information associated with the point by analyzing the electromagnetic wave reflected by the point. For example, the moving object may include one or more radar sensors. In this example, when radio waves emitted from the radar sensors are reflected from one or more points on one surface of a nearby object for a first time step, detection information associated with the points may be obtained. Based on this detection information associated with the points collected by the radar sensors, a set of the points may be recognized as the nearby object.

In an example, based on the radar provided in the moving object, relative position information of the nearby objects and/or relative velocity information of the nearby objects with respect to the radar may be obtained. That is, operation 120 may include obtaining either one or both of relative position information of the nearby objects and relative velocity information of the nearby objects with respect to the radar corresponding to the first time step. The detection information associated with the nearby objects may include detection information associated with one or more points on a surface of a nearby object from which a radio wave is reflected.

Figure 2:
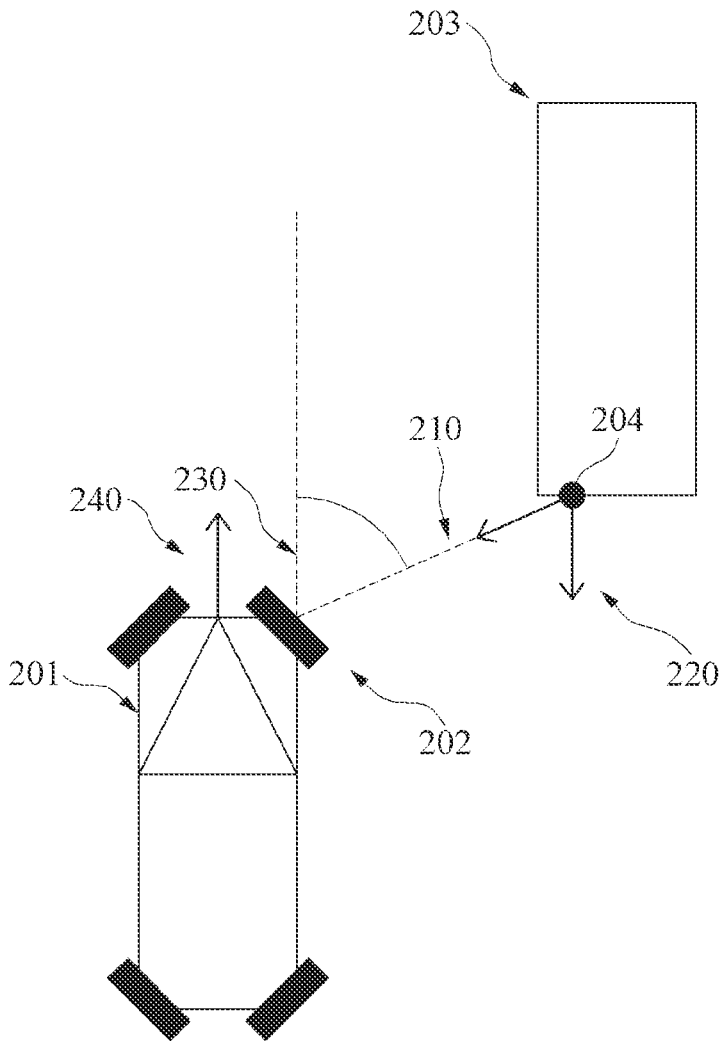
FIG. 2 illustrates an example of detection information obtained based on a radio detection and ranging (radar) sensor of a moving object.

For example, referring to FIG. 2, a radar 202 (e.g., a radar sensor) provided in a moving object 201 may emit a radio wave, and obtain detection information associated with a nearby object 203 based on an electromagnetic wave returning after the radio wave is reflected by the nearby object 203.

In this example, the detection information may include detection information associated with one or more points 204 on one surface of the nearby object 203 from which the radio wave emitted from the radar 202 is reflected.

For example, the detection information obtained as the radio wave emitted from the radar 202 is reflected by the point 204 on the surface of the nearby object 203 may include information associated with a distance 210 between the radar 202 and the point 204 and information associated with an angle 230 of the point 204 with respect to the radar 202 (e.g., with respect to a direction of movement of the radar 202). Based on the information associated with the distance 210 and the information associated with the angle 230, relative positions of the point 204 and the radar 202 may be determined.

For another example, the detection information obtained as the radio wave emitted from the radar 202 is reflected by the point 204 on the surface of the nearby object 203 may include information associated with a relative velocity 220 of the point 204 with respect to the radar 202. In this example, when the nearby object 203 is in a stationary state and the moving object 201 moves forward at a velocity 240, the point 204 of the nearby object 203 may be detected as moving backward with respect to the radar 202 at the velocity 220.

Referring back to FIG. 1, operation 130 may include selecting or determining a still object with an unchanged position from among the nearby objects present around the moving object, based on the position information obtained in operation 110 and the detection information associated with the nearby objects obtained in operation 120. Whether a nearby object is a still object or not may be determined based on a relative velocity of a nearby object detected by the radar and on velocity information of the moving object. For example, when a relative velocity of a nearby object detected by the radar is the same as a velocity of the moving object in magnitude (or when a difference between an absolute value of the relative velocity of the nearby object and an absolute value of the velocity of the moving object is less than or equal to a threshold value) but opposite to the velocity of the moving object in direction, the nearby object may be determined to be a still object because the relative velocity of the nearby object occurs by the velocity of the moving object. For example, when the moving object moves at a velocity of 10 kilometers per hour (km/h) based on the velocity information of the moving object, and a nearby object moves at a velocity of 10 km/h in an opposite direction to that of the moving object based on relative velocity information of the nearby object detected by the radar, the nearby object may be determined to be a still object because the relative velocity of the nearby object occurs by the movement of the moving object.

In an example, operation 130 of selecting a still object may include filtering out nearby objects positioned at a height greater than or equal to a preset first threshold value corresponding to a height of the moving object based on the relative position information of the nearby objects included in the detection information, and selecting a still object from among the filtered nearby objects based on the velocity information of the moving object included in the position information and the relative velocity information of the nearby objects included in the detection information. The first threshold value may be set in advance based on a standard for whether the moving object passes or not. For example, the first threshold value may include a lower limit of a height of the moving object by which the moving object may pass based on the height of the moving object.

The filtering of the nearby objects positioned at the height greater than or equal to the first threshold value may indicate excluding the nearby objects positioned at the height greater than or equal to the first threshold value from targets to be selected as a still object. A nearby object positioned at the height greater than or equal to the first threshold value may be excluded in such filtering operation, and thus the nearby object may not be selected as a still object even though the nearby object is in a stationary state. For example, in a case of a traffic light installed on a road, the traffic light may be excluded from a target to be selected as a still object because the traffic light is positioned at a height by which a vehicle may pass even though the traffic light is a still object being in a stationary state. That is, a nearby object by which the moving object may pass may be excluded through the filtering in such an object selecting operation, and it is thus possible to reduce an unnecessary operation for an object that is not considered when generating a moving path of the moving object.

In an example, operation 130 of selecting a still object may include filtering out nearby objects of which an angle formed with the moving object is greater than or equal to a preset second threshold value based on the relative position information of the nearby objects included in the detection information, and selecting a still object from among the filtered nearby objects based on the velocity information of the moving object included in the position information and on the relative velocity information of the nearby objects included in the detection information. The second threshold value may be determined based on a range of angles from which whether a nearby object is stationary is determined or a range of angles having a great probability of being included in the moving range of the moving object.

For example, in a case of a nearby object of which an angle with the moving object is 90 degrees (°), that is, a nearby object positioned on a left or right side of the moving object, whether the nearby object is a still object or a moving object may not be readily determined, and thus the nearby object may be filtered out in operation 130.

In an example, operation 140 may include updating a point cloud obtained based on the radar of the moving object in a previous time step (hereinafter also referred to as a "second time step") of the first time step, based on the position information and on detection information associated with the still object selected in operation 130 that is included in the detection information associated with the nearby objects.

The point cloud may be a set of points in a coordinate system that represents the surface of an object sensed by the sensor and may include, for example, a set of points defined as x, y, and z coordinates in a 3D coordinate system corresponding to the surface of an object sensed by the radar. The point cloud may be generated based on a signal sensed by the radar provided in the moving object, and may include a set of one or more points corresponding to the sensed signal in a 3D coordinate system having a position of the moving object as a reference point. The signal sensed by the radar may include relative position information of a point obtained based on an electromagnetic wave obtained as a radio wave emitted from the radar strikes on a point on the surface of an object and is reflected therefrom.

In an example, the point cloud having the position of the moving object as a reference point may be generated based on relative position information of points detected by the radar. The relative position information of the points detected by the radar may be transformed with respect to the position of the moving object as a reference, based on a relative position relationship between the radar and the moving object. For example, the relative position information of the points detected by the radar may correspond to relative position information obtained based on the radar, and thus the relative position information of the detected points may be transformed with respect to the position corresponding to a center of the moving object, based on a position of the radar in the moving object in which the radar is provided. That is, detection information associated with a nearby object obtained based on the radar of the moving object may include relative position information of the nearby object with respect to a position of the radar. In addition, operation 140 of updating a point cloud may further include transforming the relative position information of the still object included in the detection information based on the position of the moving object, based on the relative position relationship of the radar provided in the moving object and the moving object.

A non-limiting example of operation 140 of updating a point cloud will be described in detail with reference to FIG. 3. Referring to FIG. 3, an operation (e.g., operation 140 of FIG. 1) of updating a point cloud may include operation 310 of transforming coordinates of a first point cloud obtained in a previous time step, with respect to a position of a moving object in a first time step obtained based on position information of the moving object, operation 320 of generating a second point cloud corresponding to a still object based on detection information associated with the still object obtained in the first time step, and operation 330 of obtaining an updated point cloud corresponding to the first time step by accumulating the second point cloud with the transformed first point cloud.

In an example, the first point cloud obtained in operation 310 may correspond to a point cloud obtained in operation (e.g., operation 140 of FIG. 1) of updating a point cloud corresponding to the second time step. The first point cloud may include a set of points corresponding to a still object selected in the second time step in a 3D coordinate system having a position of the moving object in the second time step as an origin point.

In an example, in operation 310, coordinates of the first point cloud may be transformed with respect to the position of the moving object in the first time step. The position of the moving object in the first time step may be obtained based on the position information of the moving object corresponding to the first time step, for example, the position information of the moving object obtained in operation 110 of FIG. 1. The coordinates of the first point cloud may be transformed based on a displacement of the moving object. For example, the displacement of the moving object may correspond to a vector corresponding to a difference between the position of the moving object in the first time step and the position of the moving object in the second time step, and the coordinates of the first point cloud in the first time step may be transformed in a direction opposite to the displacement of the moving object.

For example, when there is no previous time step of the first time step, that is, when the first time step corresponds to an initial time step in which operations 110 through 150 of FIG. 1 are performed initially, there may be no point cloud obtained in the previous time point. Thus, an operation (e.g., operation 140 of FIG. 1) of updating a point cloud corresponding to the initial time step may include operation 320 of generating a point cloud corresponding to the still object based on the detection information associated with the still object obtained in the first time step. That is, the operation (e.g., operation 140 of FIG. 1) of updating the point cloud corresponding to the initial time step may include operation 320 of generating a second point cloud corresponding to the still object based on relative position information of the still object obtained by the radar in a current time step, without operation 310 of transforming the coordinates of the first point cloud obtained in the previous time step. The second point cloud generated in operation 320 may correspond to an updated point cloud corresponding to the current time step.

Figure 4A:
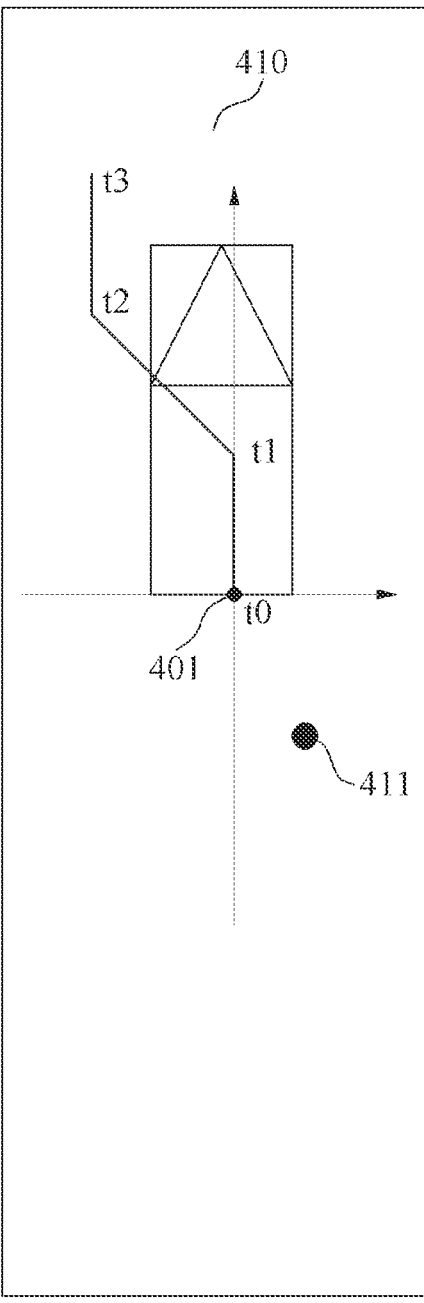
FIGS. 4A through 4D illustrate examples of transforming coordinates of a point cloud based on a displacement of a moving object in each time step.

For example, referring to FIG. 4A, a point cloud 410 obtained in a time step t0 corresponding to an initial time step may be obtained based on detection information associated with a still object obtained by a radar. For example, based on relative position information of the still object obtained from the radar, the point cloud 410 including a point 411 corresponding to the still object in a coordinate system having a preset position of a moving object as a reference point 401 may be generated.

Figure 4B:
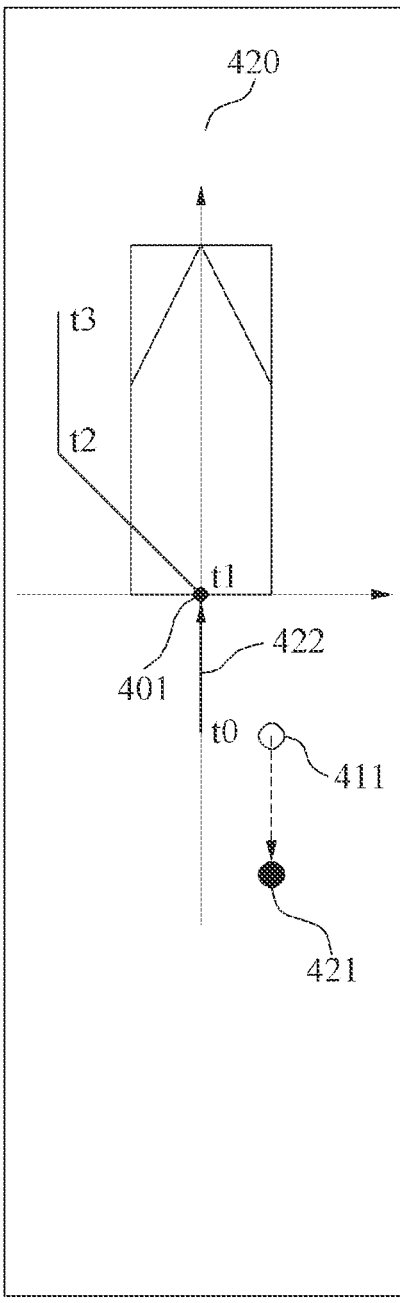

In an example, operation 140 corresponding to a subsequent time step of the initial time step may include transforming coordinates of a point cloud obtained in a previous time step based on a displacement of a moving object. For example, referring to FIG. 4B, a coordinate 411 of a point included in a point cloud obtained in a time step t0 may be transformed into a coordinate 421 based on a displacement 422 of a moving object in a subsequent time step t1 of the time step t0, and a transformed point cloud 420 may be obtained. For example, as the moving object moves by a in a y direction in the time step t1, a coordinate of a point cloud may be transformed by −a in the y direction. That is, the point cloud obtained in the time step t0 may be transformed into a coordinate corresponding to a coordinate system having a position of the moving object changed in the time step t1 as the reference point 401.

Figure 4C:
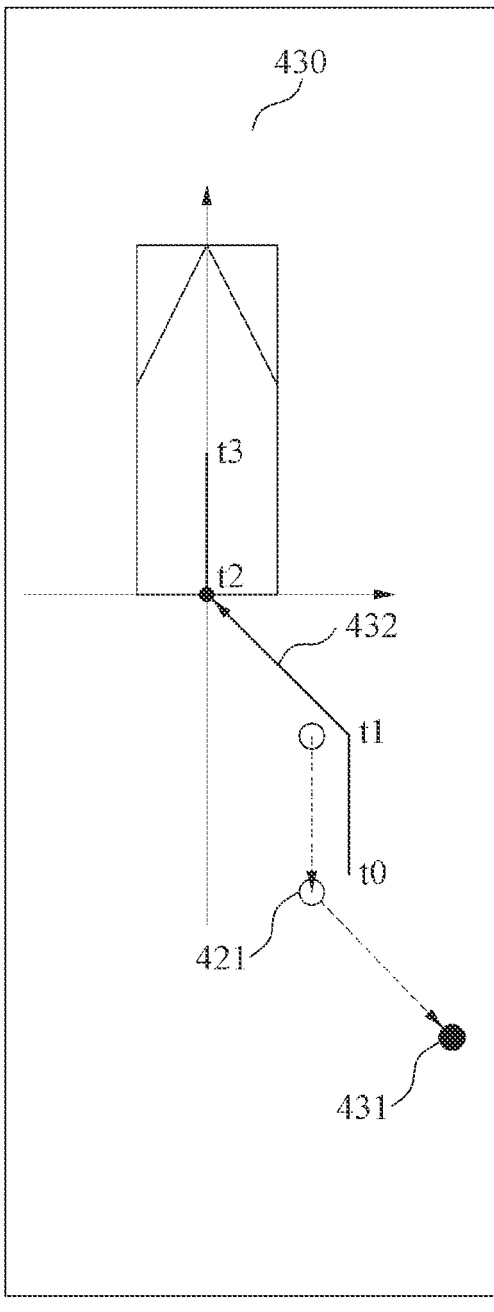
Figure 4D:
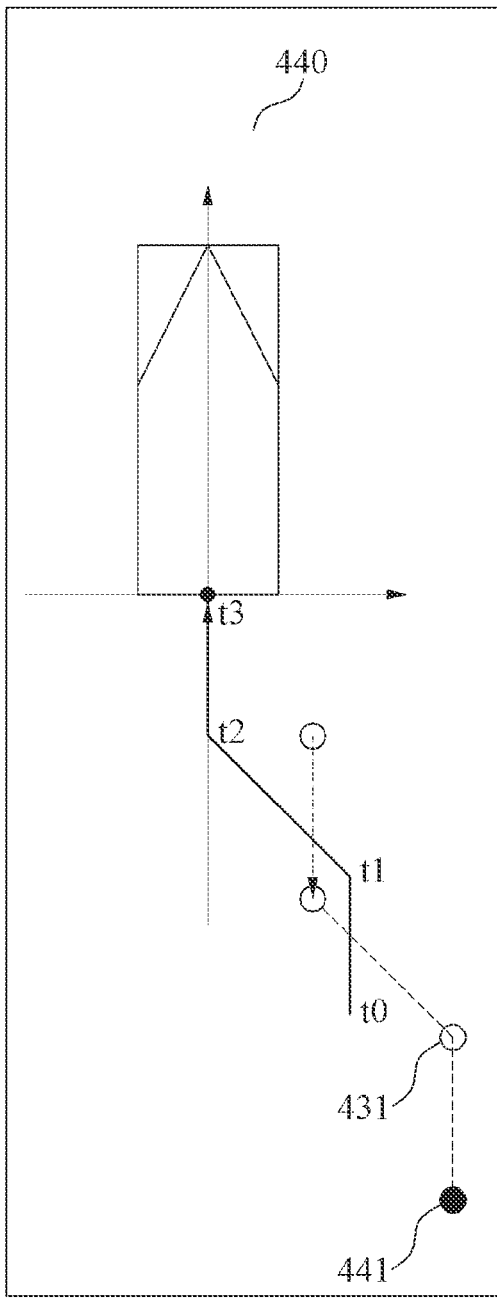

Referring to FIG. 4C, the coordinate 421 of a point included in a point cloud obtained in the time step t1 may be transformed into a coordinate 431 based on a displacement 432 of the moving object in a subsequent time step t2 of the time step t1, and a transformed point cloud 430 may be obtained. Referring to FIG. 4D, the coordinate 431 of a point included in a point cloud obtained in the time step t2 may be transformed into a coordinate 441 based on a displacement of the moving object in a subsequent time step t3 of the time step t2, and a transformed point cloud 440 may be obtained.

In an example, information associated with a displacement of a moving object in each time step may be accumulated, and information associated with a moving path of the moving object may be obtained. For example, referring to FIG. 4D, the displacements of the moving object in the time steps t0 through t3 may be accumulated, and information associated with a moving path of the moving object including a vector (t0, t1), a vector (t1, t2), and a vector (t2, t3) may be obtained.

Although the point clouds 410, 420, 430, and 440 each including one point are illustrated in FIGS. 4A through 4D, a point cloud obtained in each time step may include one or more points corresponding to one or more still objects. In addition, although a point cloud is illustrated in the form of a map corresponding to a 2D coordinate system in FIGS. 4A through 4D, the point cloud may be obtained in the form of an arrangement of coordinate values of points included in the point cloud.

Referring back to FIG. 3, the operation (e.g., operation 140 of FIG. 1) of updating a point cloud may include operation 320 of generating a second point cloud corresponding to a still object based on detection information associated with the still object obtained in a first time step.

The second point cloud may be generated based on detection information associated with a still object selected in operation 130 of FIG. 1 that is included in detection information obtained based on a radar in the first time step. For example, the second point cloud including a set of points corresponding to a still object in a 3D coordinate system having a position of a moving object in the first time step as an origin point may be generated based on relative position information of the still object obtained from the radar.

Figure 5A:
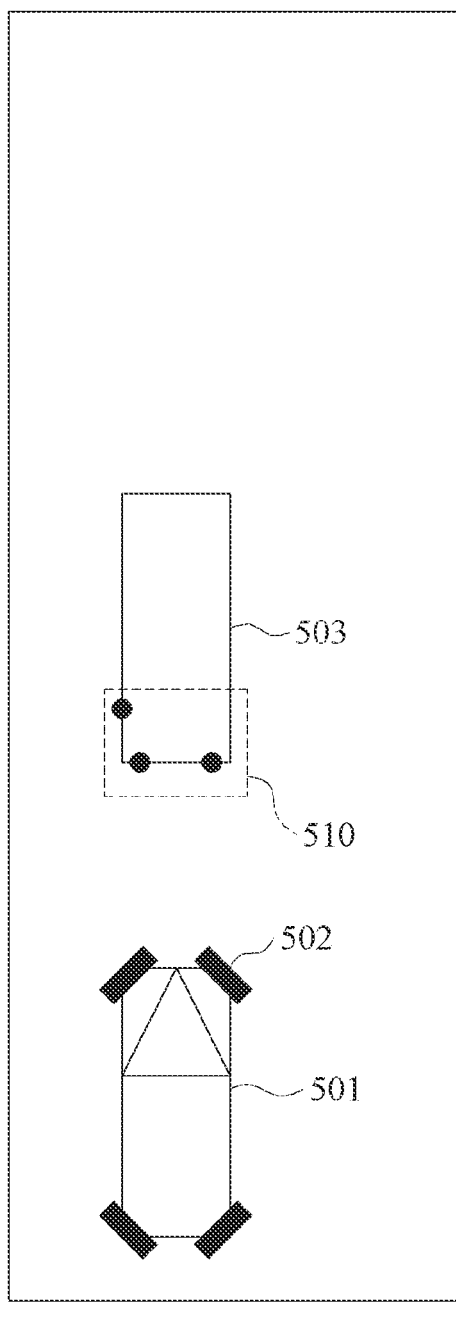
FIGS. 5A through 5C illustrate examples of generating a second point cloud in each step.
Figure 5B:
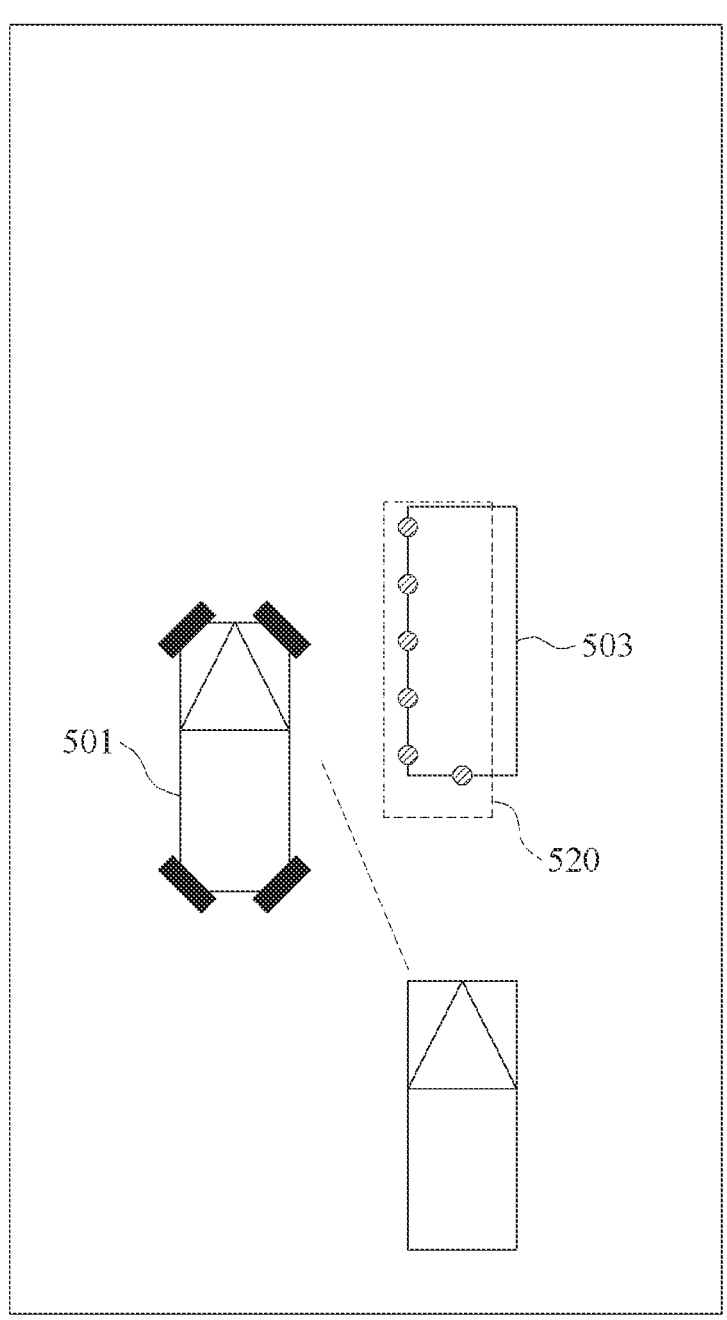
Figure 5C:
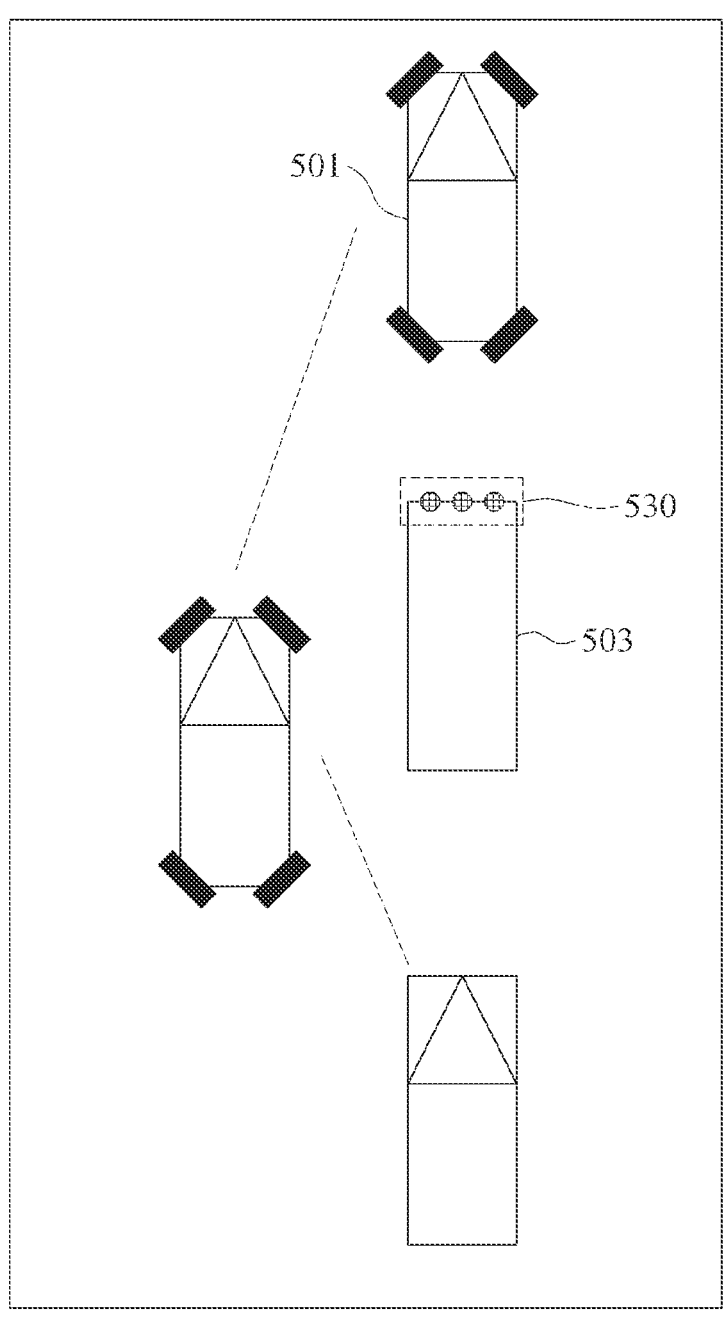

For example, referring to FIG. 5A, based on relative position information of three detected points 510 on the surface of a still object 503 obtained based on a radar 502 of a moving object 501 in a time step t0, a second point cloud corresponding to the three detected points 510 may be generated. Referring to FIG. 5B, a position of the moving object 501 may be changed in a time step t1. Based on relative position information of five detected point 520 on the surface of the still object 503 obtained based on the radar 502 of the moving object 501, a second point cloud corresponding to the five detected points 520 may be generated. Referring to FIG. 5C, a position of the moving object 501 may be changed in a time step t2. Based on relative position information of three detected points 530 on the surface of the still object 503 obtained based on the radar 502 of the moving object 501, a second point cloud corresponding to the three detected points 530 may be generated.

Referring to FIGS. 5A through 5C, detected points on the surface of the still object 503 obtained from the radar 502 of the moving object 501 in each time step may be different. That is, as illustrated in FIGS. 5A through 5C, at least a portion of the three detected points 510 obtained from the radar 502 of the moving object 501 in the time step t0 when the still object 503 is positioned in front of the moving object 501, the five detected points 520 obtained from the radar 502 of the moving object 501 in the time step t1 when the still object 503 is positioned on a side of the moving object 501, and the three detected points 530 obtained from the radar 502 of the moving object 501 in the time step t2 when the still object 503 is positioned behind the moving object 501 may be different.

Figure 6A:
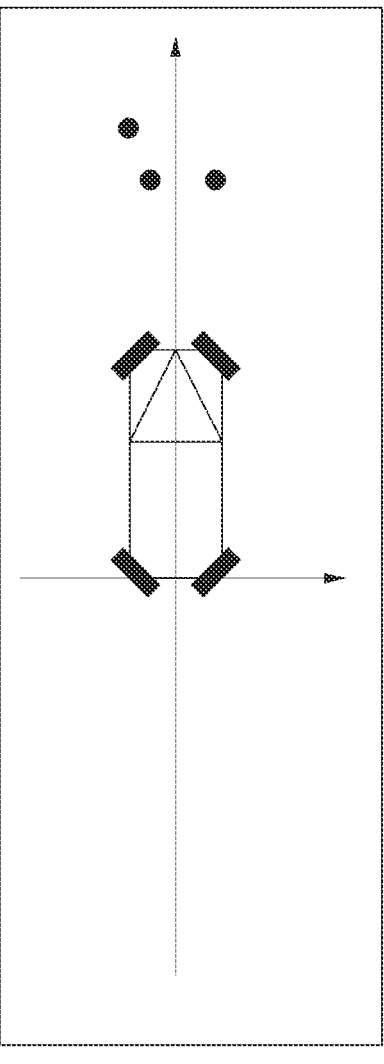
FIGS. 6A through 6C illustrate examples of obtaining an updated point cloud corresponding to each time step.
Figure 6B:
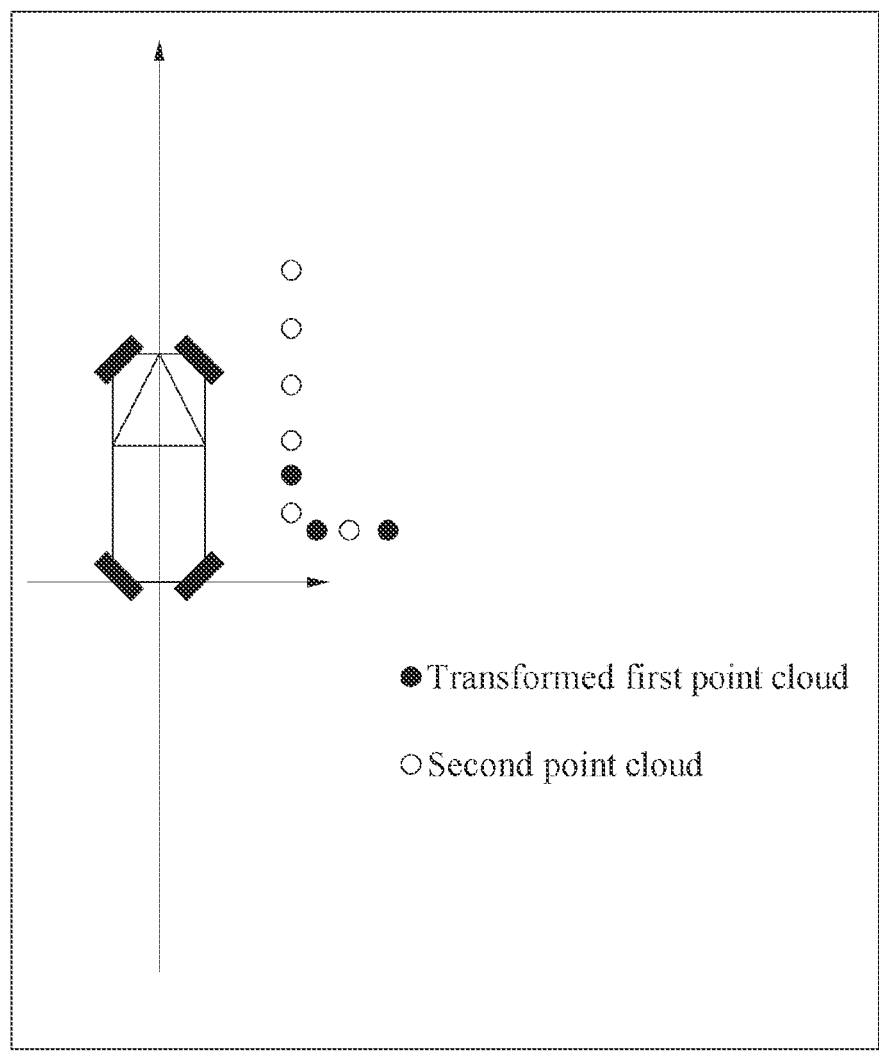
Figure 6C:
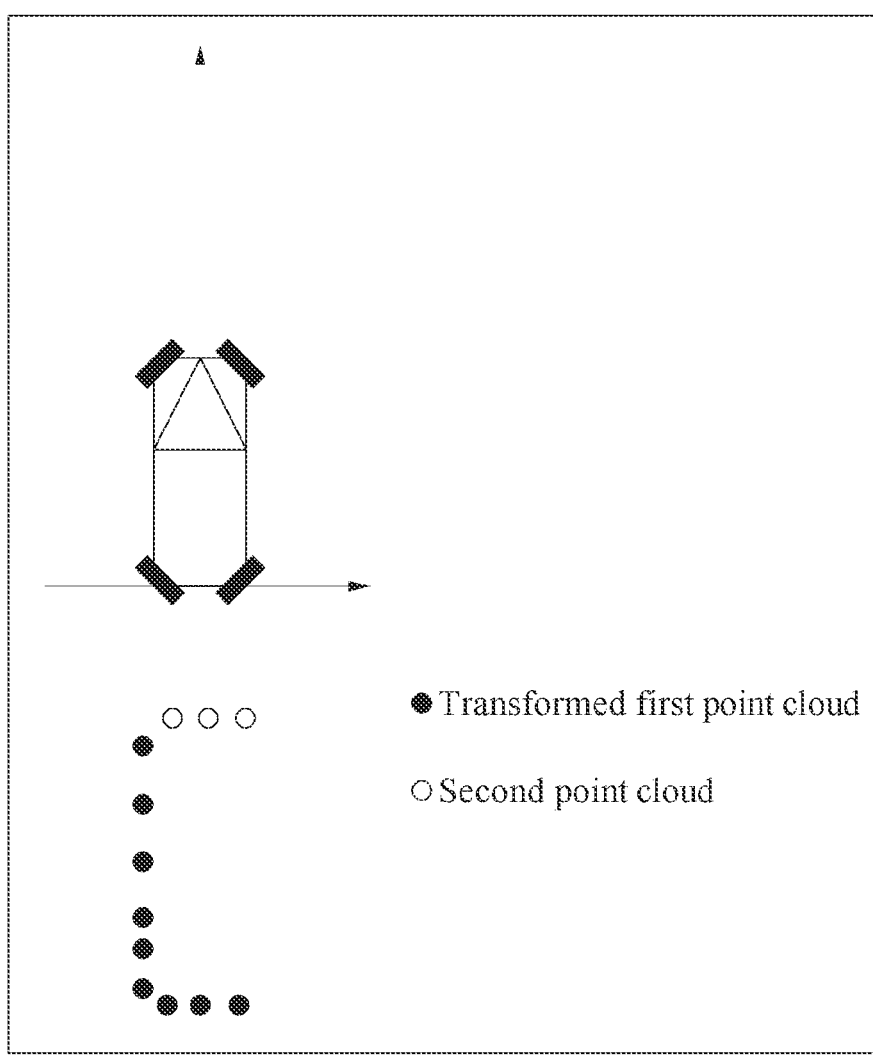

Referring back to FIG. 3, the operation (e.g., operation 140 of FIG. 1) of updating a point cloud may include operation 330 of obtaining an updated point cloud corresponding to a first time step by accumulating a second point cloud with a transformed first point cloud. For example, FIGS. 6A through 6C illustrate examples of a point cloud updated based on a second point cloud illustrated in FIGS. 5A through 5C. For example, FIG. 6A illustrates an example of an updated point cloud corresponding to a time step t0 which is a first time step, and the updated point cloud may be the same as a second point cloud corresponding to the time step t0 illustrated in FIG. 5A. FIG. 6B illustrates an example of an updated point cloud corresponding to a time step t1 which is a subsequent time step of the time step t0, and the updated point cloud may include a transformed first point cloud obtained as coordinates of a first point cloud obtained in the time step t0 illustrated in FIG. 6A is transformed based on a displacement of a moving object and include a second point cloud (the same as a second point cloud illustrated in FIG. 5B) that is generated based on detection information associated with a still object obtained in the time step t1. FIG. 6C illustrates an example of an updated point cloud corresponding to a time step t2 which is a subsequent time step of the time step t1, and the updated point cloud may include a transformed first point cloud obtained as coordinates of a first point cloud obtained in the time step t1 illustrated in FIG. 6B is transformed based on a displacement of the moving object and include a second point cloud (the same as a second point cloud illustrated in FIG. 5C) that is generated based on detection information associated with a still object obtained in the time step t2.

In an example, an updated point cloud corresponding to a first time step may be a point cloud obtained as a point cloud obtained in a second time step is updated based on detection information associated with a still object obtained in the first time step, and may correspond to a point cloud obtained in the first time step. The updated point cloud corresponding to the first time step may correspond to a point cloud obtained in a previous time step in the operation (e.g., operation 140 of FIG. 1) of updating a point cloud corresponding to a subsequent time step of the first time step, and may be updated based on position information of a moving object and detection information of a still object that are obtained in the subsequent time step.

Referring back to FIG. 3, the operation (e.g., operation 140 of FIG. 1) of updating a point cloud may further include an operation of removing a first point cloud obtained in a second time step, after operation 330 of obtaining an updated point cloud corresponding to a first time step. Since the updated point cloud corresponding to the first time step is obtained based on a transformed first point cloud corresponding to the first time step, removing the first point cloud corresponding to a previous time step from a memory may advantageously reduce the size of data to be stored in the memory.

Referring back to FIG. 1, operation 140 may further include setting a region of interest (ROI) for traveling of the moving object based on the position information of the moving object obtained in operation 110, and filtering out a point cloud corresponding to a still object that is not included in the ROI among point clouds corresponding to still objects selected in operation 130. The ROI may be a region that is likely to be included in a moving path of the moving object. For example, a still object that is positioned in an opposite direction of a moving direction of the moving object and is at a position separate from the moving object by a preset distance may be determined not to be included in the moving path of the moving object, and a point cloud corresponding to the still object may be removed from a point cloud corresponding to a first time step. The ROI for the traveling of the moving object may be set based on various preset standards in addition to a standard for the moving direction of the moving object and/or a standard for a distance from the moving object.

In an example, operation 150 may include generating a grid map based on an occupancy probability for each grid of an updated point cloud corresponding to a first time step obtained in operation 140. For example, the occupancy probability for each grid of the point cloud may be estimated based on a distribution of points included in the point cloud. The grid map may refer to a map representing a grid having a high probability of being occupied by the points included in the point cloud, based on the distribution of the points included in the point cloud. The grid having the high probability of being occupied by the points included in the point cloud that is represented in the grid map may correspond to information indicating a region occupied by a still object corresponding to the point cloud.

Figure 7A:
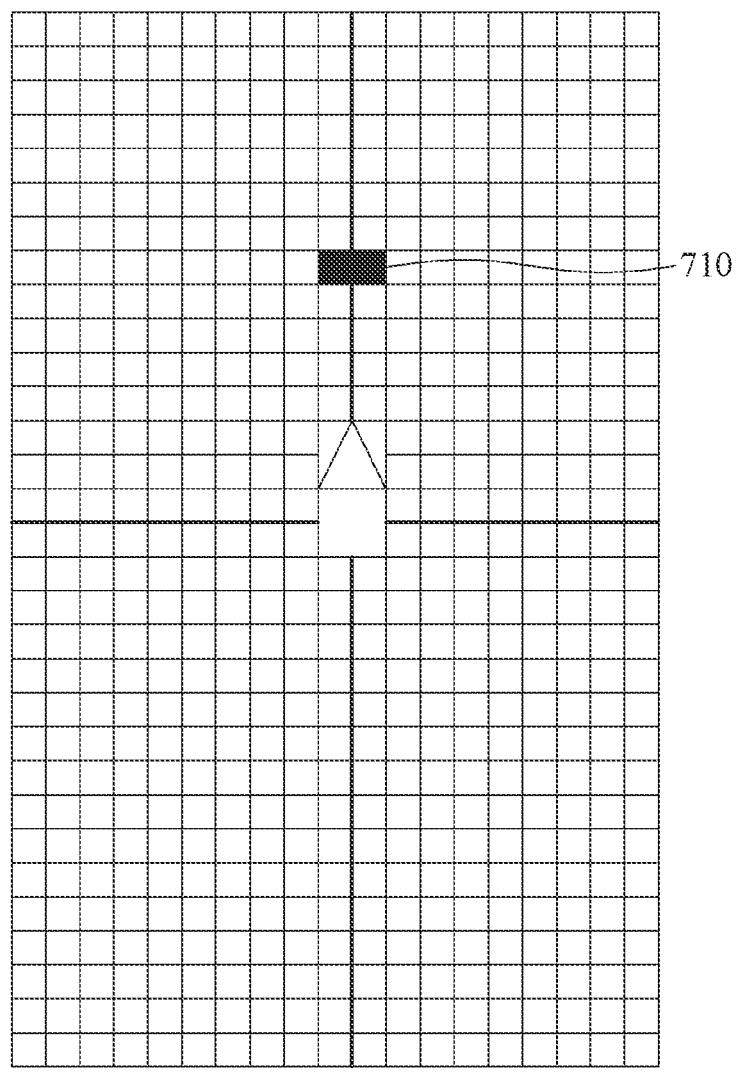
FIGS. 7A through 7C illustrate examples of generating a grip map in each time step.

For example, referring to FIG. 7A, a grid map corresponding to a set of points included in a point cloud illustrated in FIG. 6A may be generated. The grid map may correspond to a map representing a grid 710 having a high probability of being occupied by the points included in the point cloud based on a distribution of the points included in the point cloud of FIG. 6A. For another example, referring to FIG. 7B, a grid map corresponding to a set of points included in a point cloud illustrated in FIG. 6B may be generated. For still another example, referring to FIG. 7C, a grid map corresponding to a set of points included in a point cloud illustrated in FIG. 6C may be generated.

Figure 7B:
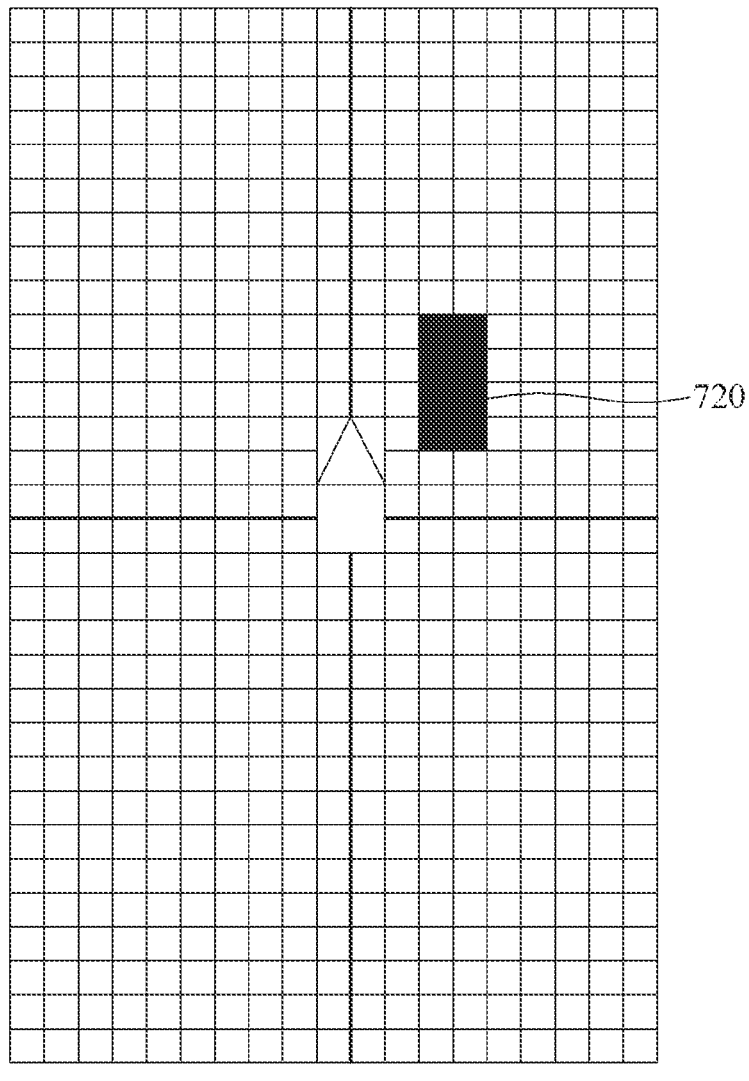
Figure 7C:
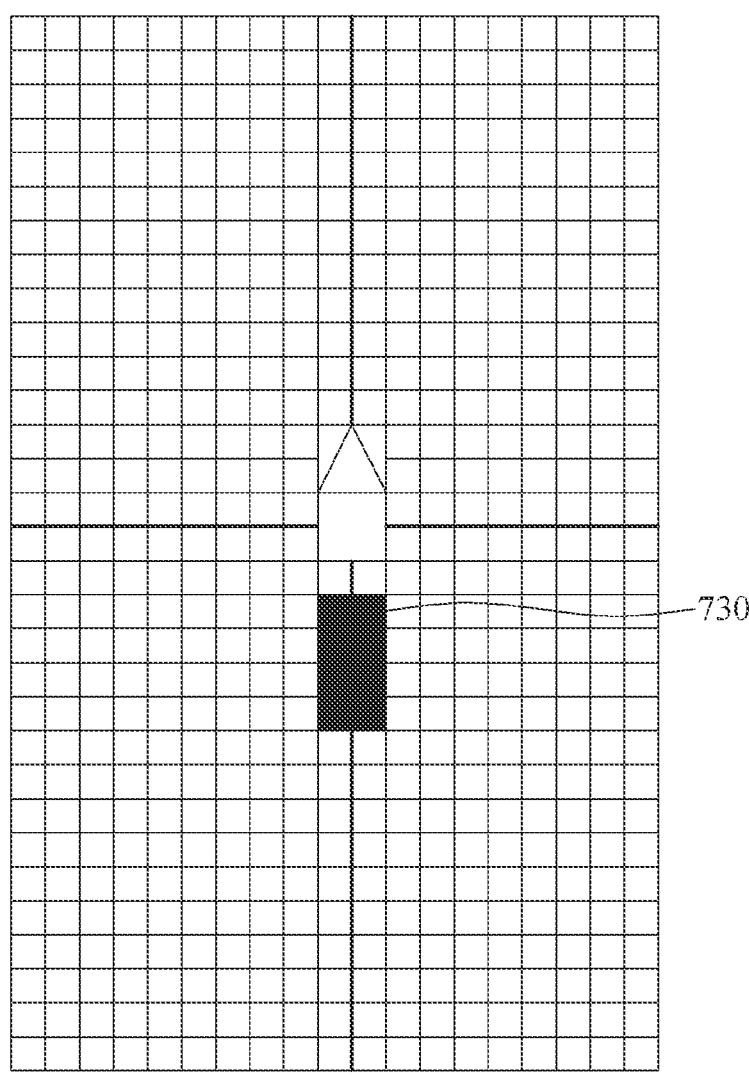

Referring to FIG. 7B, there is a region of a grid 720 that is similar to a region actually occupied by a still object corresponding to the point cloud, compared to the grid map illustrated in FIG. 7A. That is, the grid map generating method and apparatus of one or more embodiments may generate a more accurate grid map by updating a point cloud corresponding to a current time step by applying a point cloud obtained in a previous time step.

Referring back to FIG. 1, operation 150 may further include generating a moving path of the moving object corresponding to the still object, based on the generated grid map. For example, the generating of the moving path of the moving object may include generating the moving path of the moving object that detours a space occupied by the still object based on the grid map generated in operation 150. The moving path of the moving object that detours the space occupied by the still object may include a path through which the moving object detours the space occupied by the still object and is then returned to the original moving path.

For another example, the generating of the moving path of the moving object may include generating the moving path of the moving object that detours the space occupied by the still object based on the grid map generated in operation 150. The moving path of the moving object that detours the space occupied by the still object may include a path changed such that the moving object detours the space occupied by the still object, and the changed path may be maintained afterward.

Figure 8:
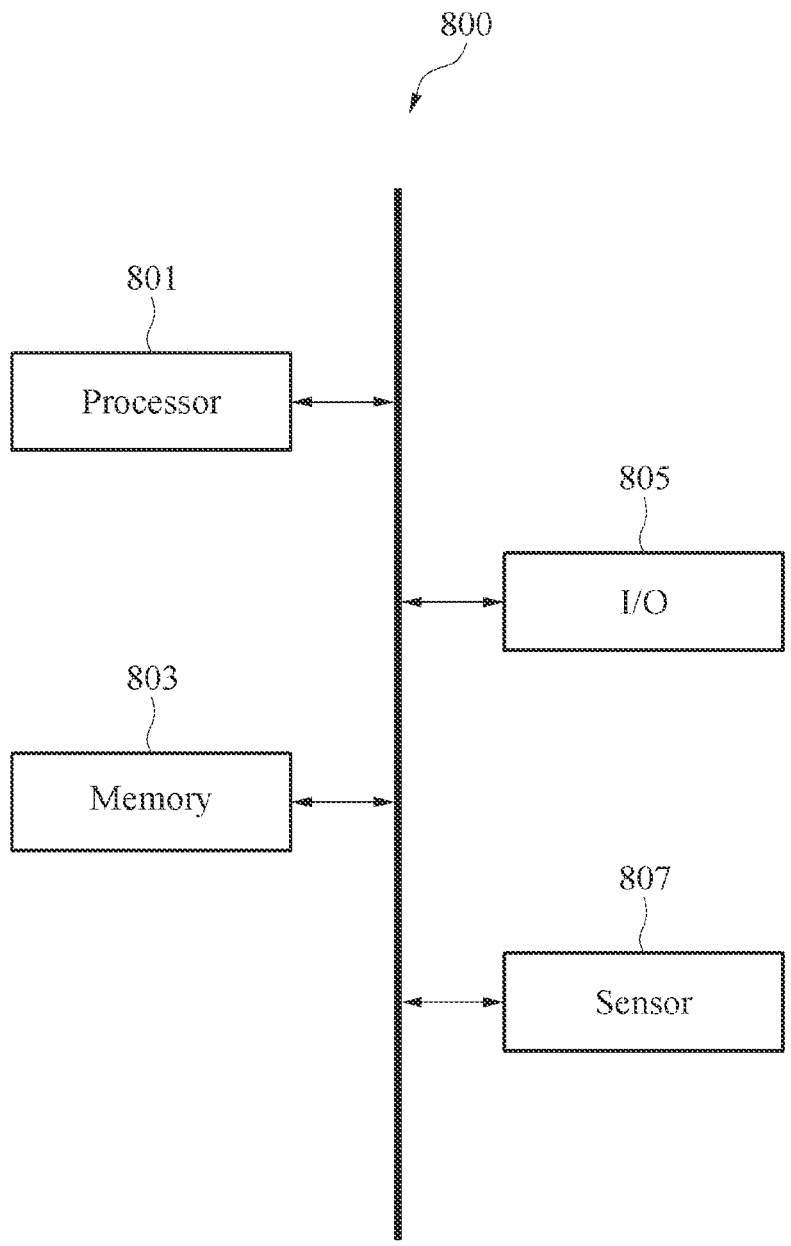
FIG. 8 illustrates an example of a grid map generating apparatus.

FIG. 8 illustrates an example of a grid map generating apparatus.

Referring to FIG. 8, a grid map generating apparatus 800 may include a processor 801 (e.g., one or more processors), a memory 803 (e.g., one or more memories), an input and output (I/O) device 805, and a sensor 807 (e.g., one or more sensors). The grid map generating apparatus 800 may perform the grid map generating method described herein and may include, for example, a server communicating with a moving object and/or a device provided in the moving object. In an example, the grid map generating apparatus 800 may be the moving object, include the moving object, and/or be included in the moving object.

The processor 801 may perform any one or more, or all, of the operations and methods described herein with reference to FIGS. 1 through 7. In an example, the processor 801 may obtain detection information associated with nearby objects from a radar provided in a moving object, and obtain position information of the moving object from a position sensor (e.g., of the sensor 807) provided in the moving object. The processor 801 may perform the operations or methods described above with reference to FIGS. 1 through 7 to generate a grid map based on the obtained detection information and the obtained position information. The processor 801 may further perform an operation of generating a moving path of the moving object based on the generated grid map.

The memory 803 may be a volatile or nonvolatile memory. The memory 803 may store therein information associated with the grid map generating method described herein. For example, the memory 803 may store therein any one or any combination of any two or more of position information of the moving object obtained in a current time step, detection information associated with nearby objects, a point cloud, and a grid map.

The grid map generating apparatus 800 may be connected to an external device (e.g., a personal computer (PC) or a network) through the I/O device 805, and exchange data with the external device through the I/O device 805. For example, the grid map generating apparatus 800 may receive a signal sensed from the position sensor and/or the radar (e.g., of the sensor 807) provided in the moving object, and output a generated grid map and/or a moving path of the moving object generated based on the grid map, through the I/O device 805. Although not illustrated in FIG. 8, the grid map generating apparatus 800 may further include a communication interface for communication with an external device, and communication with a sensor (e.g., the sensor 807) provided in the moving object may be performed through the communication interface.

The sensor 807 may be or include any one or more or all of the sensors, position sensors, radars, and lidars described herein with reference to FIGS. 1 through 7.

The memory 803 may store a program that implements the grid map generating method. The processor 801 may execute the program stored in the memory 803 and control the grid map generating apparatus 800. A code of the program executed by the processor 801 may be stored in the memory 803.

The grid map generating apparatuses, moving objects, radars, processors, memories, I/O devices, sensors, moving object 201, radar 202, moving object 501, radar 502, grid map generating apparatus 800, processor 801, memory 803, I/O device 805, sensor 807, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with grid map generation, comprising:

generating position information of a moving object corresponding to a first time step based on a position sensor of the moving object;

generating detection information of nearby objects present around the moving object corresponding to the first time step based on a radio detection and ranging (radar) sensor of the moving object;

selecting a still object in a moving range of the moving object from among the nearby objects, based on the position information and the detection information;

generating an updated point cloud by updating a point cloud determined based on the radar sensor in a previous time step of the first time step, based on the position information and on detection information of the still object comprised in the detection information of the nearby objects, wherein the detection information includes relative position information of the still object with respect to the position of the moving object; and generating a grid map based on an occupancy probability for each grid of the updated point cloud, wherein the generating of the updated point cloud comprises:

transforming coordinates of a first point cloud determined in the previous time step based on the position information;

generating a second point cloud corresponding to the still object, based on detection information of the still object determined in the first time step; and generating the updated point cloud corresponding to the first time step based on the transformed first point cloud and the second point cloud, wherein the detection information comprises relative position information of the nearby objects with respect to a position of the radar sensor, and wherein the generating of the updated point cloud further comprises transforming relative position information of the still object comprised in the detection information with respect to a position of the moving object, based on a relative position relationship of the radar sensor and the moving object.

2. The method of claim 1, wherein the transforming of the coordinates of the first point cloud is with respect to a position of the moving object in the first time step determined based on the position information;

and wherein the generating of the updated point cloud comprises accumulating the second point cloud with the transformed first point cloud.

3. The method of claim 2, further comprising removing the first point cloud determined in the previous time step.

4. The method of claim 1, wherein the selecting of the still object comprises:

filtering out nearby objects positioned at a height greater than or equal to a preset first threshold value corresponding to a height of the moving object, based on relative position information of the nearby objects comprised in the detection information; and selecting the still object from among the filtered nearby objects, based on velocity information of the moving object comprised in the position information and relative velocity information of the nearby objects comprised in the detection information.

5. The method of claim 1, wherein the selecting of the still object comprises:

filtering out nearby objects of which an angle formed with the moving object is greater than or equal to a preset second threshold value, based on relative position information of the nearby objects comprised in the detection information; and selecting the still object from among the filtered nearby objects, based on velocity information of the moving object comprised in the position information and relative velocity information of the nearby objects comprised in the detection information.

6. The method of claim 1, wherein the generating of the updated point cloud further comprises:

generating a region of interest (ROI) of traveling of the moving object based on the position information of the moving object; and filtering out a point cloud corresponding to a still object that is not comprised in the ROI among point clouds corresponding to still objects selected through the selecting.

7. The method of claim 1, wherein the generating of the grid map further comprises generating a moving path of the moving object corresponding to the still object based on the grid map.

8. The method of claim 7, wherein the generating of the moving path of the moving object comprises generating the moving path of the moving object that detours a space occupied by the still object, based on the grid map.

19

9. The method of claim 1, wherein the generating of the position information of the moving object comprises determining any one or any combination of any two or more of velocity information of the moving object, yaw rate information of the moving object, and global positioning system (GPS) information of the moving object corresponding to the first time step.

10. The method of claim 1, wherein the generating of the detection information of the nearby objects comprises determining either one or both of relative position information of the nearby objects and relative velocity information of the nearby objects with respect to the radar sensor corresponding to the first time step.

11. The method of claim 1, wherein the point cloud is generated based on a signal sensed by the radar sensor, and comprises a set of one or more points corresponding to the sensed signal in a coordinate system having a position of the moving object as a reference point.

12. A non-transitory computer-readable storage medium storing instructions that, when executed by one or more processors, configure the one or more processors to perform the method of claim 1.

13. An apparatus with grid map generation, comprising: one or more processors configured to:

generate position information of a moving object corresponding to a first time step based on a position sensor of the moving object;

generate detection information of nearby objects present around the moving object corresponding to the first time step based on a radio detection and ranging (radar) sensor of the moving object;

select a still object in a moving range of the moving object from among the nearby objects based on the position information and the detection information;

generate an updated point cloud determined based on the radar sensor in a previous time step of the first time step, based on the position information and detection information of the still object comprised in the detection information of the nearby objects, wherein the detection information includes relative position information of the still object with respect to the position of the moving object; and generating a grid map based on an occupancy probability for each grid of the updated point cloud, wherein the generating of the updated point cloud comprises:

transform coordinates of a first point cloud determined in the previous time step based on the position information;

generate a second point cloud corresponding to the still object, based on detection information of the still object determined in the first time step; and generate the updated point cloud corresponding to the first time step based on the transformed first point cloud and the second point cloud, wherein the detection information comprises relative position information of the nearby objects with respect to a position of the radar sensor, and wherein for the generating of the updated point cloud, the one or more processors are configured to transform relative position information of the still object comprised in the detection information with respect to a position of the moving object, based on a relative position relationship of the radar sensor and the moving object.

14. The apparatus of claim 13, wherein the transformation of the coordinates of the first point cloud is with respect to a position of the moving object in the first time step determined based on the position information;

and wherein the generation of the updated point cloud comprises accumulating the second point cloud with the transformed first point cloud.

15. The apparatus of claim 13, wherein, for the selecting of the still object, the one or more processors are configured to:

filter out nearby objects positioned at a height greater than or equal to a preset first threshold value corresponding to a height of the moving object, based on relative position information of the nearby objects comprised in the detection information; and select the still object from among the filtered nearby objects, based on velocity information of the moving object comprised in the position information and relative velocity information of the nearby objects comprised in the detection information.

16. The apparatus of claim 13, wherein, for the selecting of the still object, the one or more processors are configured to:

filter out nearby objects of which an angle formed with the moving object is greater than or equal to a preset second threshold value, based on relative position information of the nearby objects comprised in the detection information; and select the still object from among the filtered nearby objects, based on velocity information of the moving object comprised in the position information and relative velocity information of the nearby objects comprised in the detection information.

17. The apparatus of claim 13, wherein, for the generating of the updated point cloud, the one or more processors are configured to:

generate a region of interest (ROI) of traveling of the moving object based on the position information of the moving object; and filter out a point cloud corresponding to a still object that is not comprised in the ROI among point clouds corresponding to still objects selected through the selecting.

18. The apparatus of claim 13, wherein, for the generating of the grid map, the one or more processors are configured to generate a moving path of the moving object corresponding to the still object based on the grid map.

19. A method with grid map generation, comprising:

generating a first point cloud of a stationary object using a radio detection and ranging (radar) sensor at a first position;

transforming coordinates of the first point cloud based on a second position of the radar sensor;

generating a second point cloud of the stationary object using the radar sensor at the second position, generating an updated point cloud of the stationary object based on the second point cloud and the transformed first point cloud; and generating a grid map based on an occupancy probability for each grid of the updated point cloud, wherein the generating of the updated point cloud comprises:

transforming the coordinates of the first point cloud generated in the first position, based on the stationary object;

generating the second point cloud corresponding to the stationary object, based on detection information of the stationary object generated in the second position, wherein the detection information includes relative position information of the stationary object with respect to the second position of the radar sensor; and generating the updated point cloud corresponding to the second position based on the transformed first point cloud and the second point cloud, wherein the generating of the first point cloud comprises generating the first point cloud in response to determining that a difference between an absolute value of a relative velocity of the stationary object and an absolute value of the velocity of the radar sensor is less than or equal to a preset threshold value.

20. The method of claim 19, wherein the radar sensor is a moving object.

21. The method of claim 19, wherein the generating of the first point cloud comprises generating the first point cloud in response to determining that either one or both of:

a height of the stationary object is less than or equal to a preset first threshold value; and an angle between a direction of movement of the radar sensor and a direction from the radar sensor to the stationary object is less than or equal to a preset second threshold value.

\* \* \* \* \*